US007650485B1

(12) United States Patent
Chou

(10) Patent No.: US 7,650,485 B1
(45) Date of Patent: Jan. 19, 2010

(54) STRUCTURE AND METHOD FOR ACHIEVING VERY LARGE LOOKAHEAD INSTRUCTION WINDOW VIA NON-SEQUENTIAL INSTRUCTION FETCH AND ISSUE

(75) Inventor: Yuan C. Chou, Los Gatos, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 274 days.

(21) Appl. No.: 11/786,337

(22) Filed: Apr. 10, 2007

(51) Int. Cl.
*G06F 9/48* (2006.01)
(52) U.S. Cl. .................... 712/214; 712/217
(58) Field of Classification Search ............. 712/217, 712/214
See application file for complete search history.

(56) References Cited

U.S. PATENT DOCUMENTS

| 5,511,172 | A  | * | 4/1996 | Kimura et al. ............. 712/235 |
| 6,928,645 | B2 | * | 8/2005 | Wang et al. ................ 718/102 |
| 7,055,021 | B2 | * | 5/2006 | Kadambi .................... 712/217 |
| 7,114,060 | B2 |   | 9/2006 | Chaudhry et al. .......... 712/219 |
| 7,404,067 | B2 | * | 7/2008 | Aamodt et al. ............. 712/219 |
| 2003/0005266 | A1 | * | 1/2003 | Akkary et al. ............. 712/220 |
| 2005/0154866 | A1 | * | 7/2005 | Steely et al. ............... 712/228 |
| 2005/0273580 | A1 | * | 12/2005 | Chaudhry et al. ......... 712/218 |
| 2006/0064692 | A1 | * | 3/2006 | Sanchez et al. ............ 718/100 |
| 2006/0212689 | A1 |   | 9/2006 | Chaudhry et al. ......... 712/228 |

OTHER PUBLICATIONS

Collins, D. etal, Dynamic Speculative Precomputation, 2001, IEEE pp. 306-317.*

* cited by examiner

*Primary Examiner*—Eric Coleman
(74) *Attorney, Agent, or Firm*—Gunnison, McKay & Hodgson, L.L.P.; Forrest Gunnison

(57) ABSTRACT

A multithreading processor achieves a very large lookahead instruction window by allowing non-sequential fetch and processing of the dynamic instruction stream. A speculative thread is spawned at a specified point in the dynamic instruction stream and the instructions subsequent to the specified point are speculatively executed so that these instructions are fetched and issued out of sequential order. Very minimal modifications to existing processor design of a multithreading processor are required to achieve the very large lookahead instruction window. The modifications include changes to the control logic of the issue unit, only three additional bits in the register scoreboard.

19 Claims, 5 Drawing Sheets

STRUCTURE AND METHOD FOR ACHIEVING VERY LARGE LOOKAHEAD INSTRUCTION WINDOW VIA NON-SEQUENTIAL INSTRUCTION FETCH AND ISSUE

BACKGROUND OF THE INVENTION

1. Field of the Invention

The present invention relates generally to speculative instruction execution in a processor, and more particularly to achieving a very large lookahead instruction window via non-sequential instruction fetch and issue.

2. Description of Related Art

A rather common computer program feature is a loop where each iteration has a large number of dependent floating-point operations but there are few or no data dependencies between iterations. A traditional issue mechanism in a prior art processor was unable to extract much instruction-level parallelism (ILP) because the processor has a limited lookahead instruction window.

Typically, the number of entries in an issue queue of the processor limited the size of the lookahead instruction window. Consequently, the processor only picked instructions for issue from one iteration of the loop. Unfortunately, these instructions were dependent on one another. Thus, the processor was forced to execute the instructions sequentially.

To achieve a very large lookahead instruction window, a traditional out-of-order processor required a very large issue queue. However, such an issue queue was impractical since the issue queue was usually implemented as a content-addressable memory (CAM) structure to support associative searches. A large CAM typically had an unacceptable cycle time and/or power impact.

On the other hand, some processors, with a capability to selectively defer execution of instructions, (See for example, commonly assigned, U.S. Pat. No. 7,114,060 B2, entitled "Selectively Deferring Instructions Issued in Program Order Utilizing a Checkpoint and Multiple Deferral Scheme," of Shailender Chaudhry and Marc Tremblay, issued on Sep. 26, 2006, which is incorporated herein by reference in its entirety) could potentially support a very large instruction window because long latency operations such as L2 cache misses did not block the pipeline. However, in the above loop example, the current implementation of such processors, even in a Simultaneous Speculative Threading (SST) mode, does not achieve a very large lookahead instruction window because the processor processes the dynamic instruction stream sequentially. Since each loop iteration is a long chain of dependent floating-point (e.g. execution of instruction fmuladd) operations, the issue mechanism processes the dynamic instruction stream slowly and is unable to achieve a large lookahead instruction window. Such a processor supports two threads, and to implement the SST mode, provides mechanisms to allow close interaction between the two threads, e.g., each thread has a copy of the register file. See commonly assigned, U.S. Patent Application Publication No. 2006/0212689 A1, entitled "Method and Apparatus for Simultaneous Speculative Threading" of Shailender Chaudhry et al., published Sep. 21, 2006, and filed Apr. 24, 2006, which is incorporated herein by reference in its entirety.

SUMMARY OF THE INVENTION

In one embodiment, an architectural thread executing on a computer processor executes instructions in a dynamic instruction stream. The architectural thread spawns a speculative thread at a specified location in the dynamic instruction stream. Upon being spawned, the speculative thread executes instructions in the dynamic instruction stream subsequent to the specified location so that instructions in the dynamic instruction stream are fetched and issued out of sequential order for execution by the speculative thread. The specified location is at least more than two-hundred instructions beyond the oldest instruction that is awaiting completion of execution for the architectural thread.

The architectural thread uses an architectural register file. The architectural register file stores only architectural values. The speculative thread uses a speculative register file. The speculative register file stores architectural values and speculative values. Thus, each thread has a copy of the register file.

The architectural thread and the speculative thread are executing simultaneously. For example, the architectural thread can be executing a first iteration of a loop at the same time the speculative thread is executing a second iteration of the same loop. This ability provides dramatic improvements in processor performance for same applications.

The executing by the speculative thread includes applying a bit mask to expected live-in bits in a register scoreboard to assert an expected live-in bit for each register that the speculative thread expects to have a value made available by the execution of the architectural thread. In executing an instruction that reads a register, the speculative thread checks a state of a written bit, in a register scoreboard, for that register. The speculative thread asserts a read-before-written bit for the register in the register scoreboard when the checking ascertains that the written bit is not asserted. In executing an instruction that writes that register, the architectural thread reads the read-before-written bit for the register and the speculative thread is flushed upon the architectural thread determining the read-before-written bit is asserted.

In another embodiment, in executing an instruction that writes a register, the architectural thread reads a read-before-written bit for the register in a register scoreboard, and the speculative thread is flushed upon the architectural thread determining the read-before-written bit is asserted.

In executing a load instruction, the speculative thread (i) performs the operations associated with an instruction that reads a register; (ii) performs the operations associated an instruction that writes a register; and in addition, (iii) obtains a latest value from one of a speculative store buffer; an architectural store buffer; and a data cache. The line in the data cache corresponding to the load is marked to indicate that at least a portion of the line was speculatively loaded. The speculative thread is flushed upon eviction of the line from the data cache or when the architectural thread stores to at least the portion of the line.

In executing an instruction that writes a register, the speculative thread asserts a written bit for the register in a register scoreboard.

In executing an instruction that reads a register, the speculative thread checks a state of an expected live-in bit, in a register scoreboard, for the register. The speculative thread sets an execution mode for the speculative thread to Execute Ahead when the state of the expected live-in bit is an asserted state and the execution mode is currently Normal. The execution of the instruction is temporarily deferred.

In executing an instruction that writes a register, the architectural thread checks a state of an expected live-in bit, in a register scoreboard, for the register. The architectural thread sets an execution mode for the speculative thread to delay when the state of the expected live-in bit is an asserted state and the current execution mode is Normal, and then de-asserts the expected live-in bit.

In executing an instruction that writes a register, the architectural thread also checks a state of a written bit, in a register scoreboard, for the register and writes to the register in a speculative register file when the state of the written bit is a de-asserted state.

In one embodiment, a system includes a memory having embedded therein computer executable instructions. Execution of the computer executable instructions by a processor coupled to the memory results in a method comprising:

executing, by an architectural thread, instructions in a dynamic instruction stream;

spawning a speculative thread at a specified location in the dynamic instruction stream during the executing by the architectural thread; and executing, by the speculative thread, instructions in the dynamic instruction stream subsequent to the specified location so that instructions in the dynamic instruction stream are fetched and issued out of sequential order with respect to the executing by the architectural thread.

The specified location is at least more than two hundred instructions beyond the oldest instruction that is awaiting completion of execution for the architectural thread.

In one embodiment, the system includes a register scoreboard including a plurality of register entries. Each register entry includes a written bit, a read-before-written bit, and an expected live-in bit.

In a still further embodiment, a computer program product includes a tangible computer readable medium having embedded therein computer program instructions wherein execution of the computer program instructions by a computer processor results in a method including:

executing, by an architectural thread, instructions in a dynamic instruction stream;

spawning a speculative thread at a specified location in the dynamic instruction stream during the executing by the architectural thread; and executing, by the speculative thread, instructions in the dynamic instruction stream subsequent to the specified location so that instructions in the dynamic instruction stream are fetched and issued out of sequential order with respect to the executing by the architectural thread.

The specified location is at least more than two-hundred instructions beyond the oldest instruction that is awaiting completion of execution for the architectural thread.

BRIEF DESCRIPTION OF THE DRAWINGS

In the drawings and following Detailed Description, elements with the same reference numeral are the same or equivalent elements. The first digit of a reference numeral is the figure number of the figure in which the element with that reference numeral first appeared.

Figure 1A:
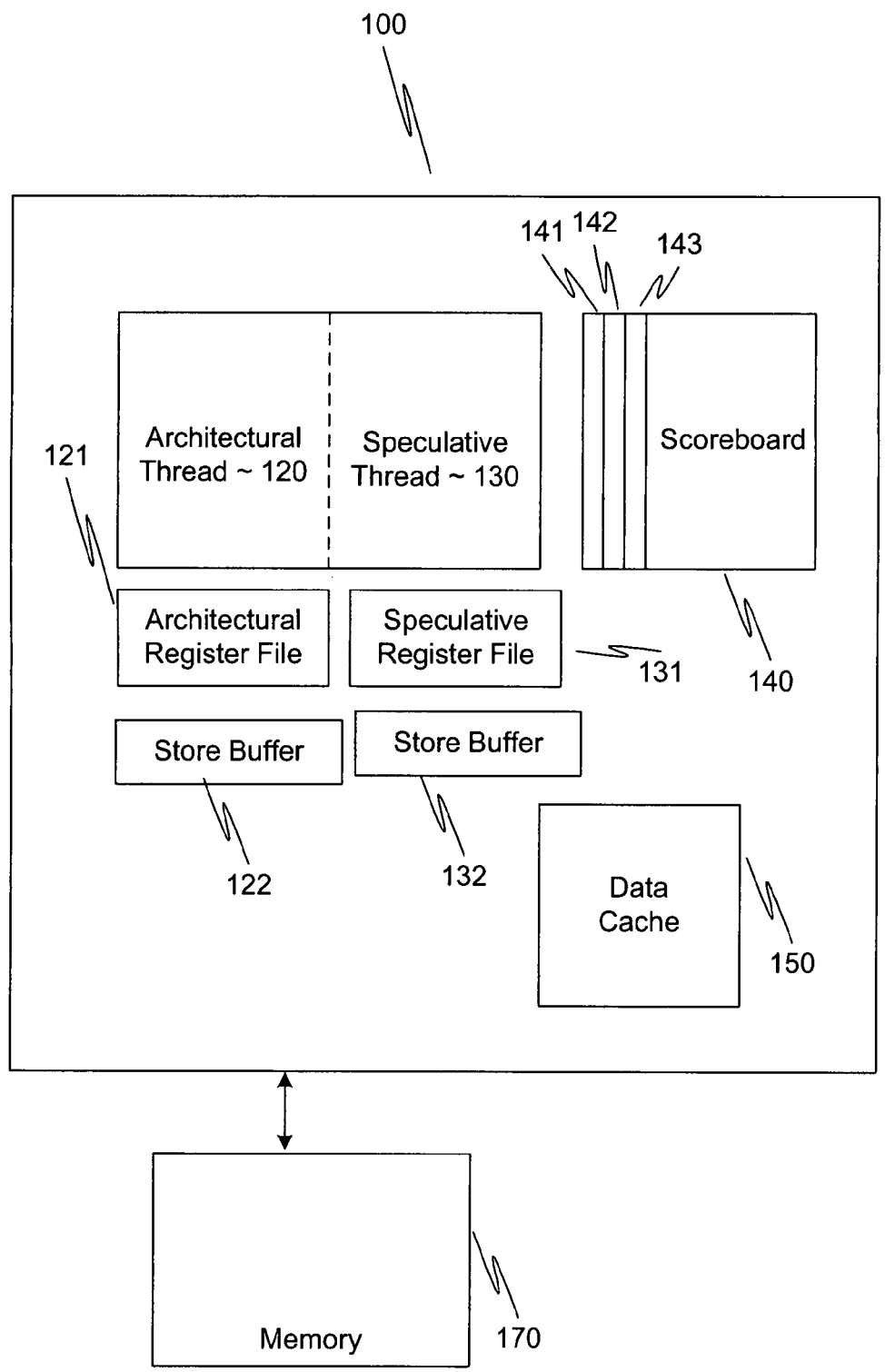
FIG. 1A is a block diagram illustrating a processor including structures to support a very large lookahead instruction window according to one embodiment of this invention.

As used in the following detailed description, architectural registers are a limited set of registers read and written by instructions in machine language programs. The limited set of registers is specified by the instruction set architecture (ISA) for a processor.

As used in the following detailed description, an architectural thread is the portion of the machine language program that reads and writes to the architectural registers.

As used in the following detailed description, a very large lookahead instruction window is an ability of a processor to consider for execution instructions that are more than two-hundred instructions beyond the oldest instruction that is awaiting completion of execution.

DETAILED DESCRIPTION

One embodiment of this invention takes advantage of existing support for multithreading of processor 100 (FIG. 1) to achieve a very large lookahead instruction window by allowing non-sequential fetch and processing of the dynamic instruction stream. Specifically, a speculative thread is spawned at a specified point in the dynamic instruction stream and the instructions subsequent to the specified point are speculatively executed so that these instructions are fetched and issued out of sequential order. One processor suitable for use with this invention is described in commonly assigned U.S. Pat. No. 7,114,060 B2, entitled "Selectively Deferring Instructions Issued in Program Order Utilizing a Checkpoint and Multiple Deferral Scheme," of Shailender Chaudhry and Marc Tremblay, issued on Sep. 26, 2006, and in commonly assigned U.S. Patent Application Publication No. 2006/0212689 A1, entitled "Method and Apparatus for Simultaneous Speculative Threading" of Shailender Chaudhry et al., published Sep. 21, 2006, and filed Apr. 24, 2006, both of which have been incorporated herein by reference in their entireties.

The very large lookahead instruction window is achieved with minimal modifications to the processor's existing design. The processor's performance is substantially improved on many floating-point technical workloads by the ability to jump ahead to the specified point in the dynamic instruction stream and start speculative execution. For example, a second iteration of a large loop can be executed simultaneously with execution of the first iteration of that loop, while in the prior art, the processor limitations prevented other than sequential execution of the two iterations.

Extensive experimental evaluations with many technical workloads (such as the SPECfp2000 benchmarks) show that typically an improvement of two in processor performance is obtained when the processor's issue mechanism is able to pick instructions for issue from a very large lookahead instruction window. The experimental results show that these performance improvements can be obtained even with a narrow (e.g. four wide) issue width and a small number of execution units.

As an example, processor 100 supports two threads. One thread is an architectural (i.e. non-speculative) thread 120. The other thread is a speculative thread 130. Each thread 120, 130 has a copy of the register file, e.g., architectural register file 121, and speculative register file 131. In one embodiment, speculative register file 131 is implemented using shadow registers. Architectural register file 121 contains only architectural values while speculative register file 131 contains architectural as well as speculative values. While in this example, two threads 120, 130 are considered, in view of this disclosure, one of skill in the art can easily extend the number of threads to an arbitrary number of threads.

No new execution modes are added to processor 100, which has an Execute Ahead mode EXE, a Normal mode NOR, and a Delay mode DLY. When data for an instruction is unavailable, the instruction is placed in a deferred instruction queue, and the execution mode is changed from Normal mode NOR to Execute Ahead mode EXE. When the data becomes available, the execution mode is changed to Delay mode DLY so that the processor knows that the instruction in the deferred instruction queue can be executed. As described more completely below, a new condition for transition to Execute Ahead mode EXE and a new condition for transition to Delay mode DLY are added in one embodiment.

In one embodiment, the processor's register scoreboard 140, which has an entry for every architectural register, is augmented with three additional bits 141, 142, 143 per entry: a state of an expected live-in bit 141 is used to indicate whether a value in the register is expected to be made available to speculative thread 130 by architectural thread 120; a state of a read-before-written bit 143 is used to indicate whether the register was read-before-written by speculative thread 130; and a state of a written bit 142 is used to indicate whether the register was written by speculative thread 130.

Also, in FIG. 1A, only the elements needed to describe the embodiments of this invention are included. Those of skill in the art will understand that a processor that supports multithreading includes components in addition to those described herein, which are not included in FIG. 1A to avoid detracting from the description of the embodiments of the invention.

In one embodiment, the processor's instruction set is extended with three new instructions. Instruction spawn thread_start_PC is used to spawn a speculative thread that begins execution at location thread_start_PC. Instruction set_live_in_mask with argument bit_mask is used to set the expected live-in bits 141 of register scoreboard 140 using the bit mask bit_mask, sometimes referred to as the expected live-in bit mask. As described later, second instruction set_live_in_mask is optional and is used as an optimization to improve performance. Instruction kill is used to flush speculative thread 130 when architectural thread 120 jumps over the computer program segment being executed by speculative thread 130.

These instructions can be inserted in a program either by a compiler or by a runtime optimizer, for example. Also, processor 100 may choose to ignore instruction spawn thread_start_PC if the second strand (the hardware used to execute speculative thread 130) in processor 100 is already busy (e.g. executing an independent thread). In other embodiments, hardware mechanisms may be used to automatically spawn speculative thread 130 and to set expected live-in bits 141 of register scoreboard 140 based on observed dynamic program behavior.

Figure 1B:
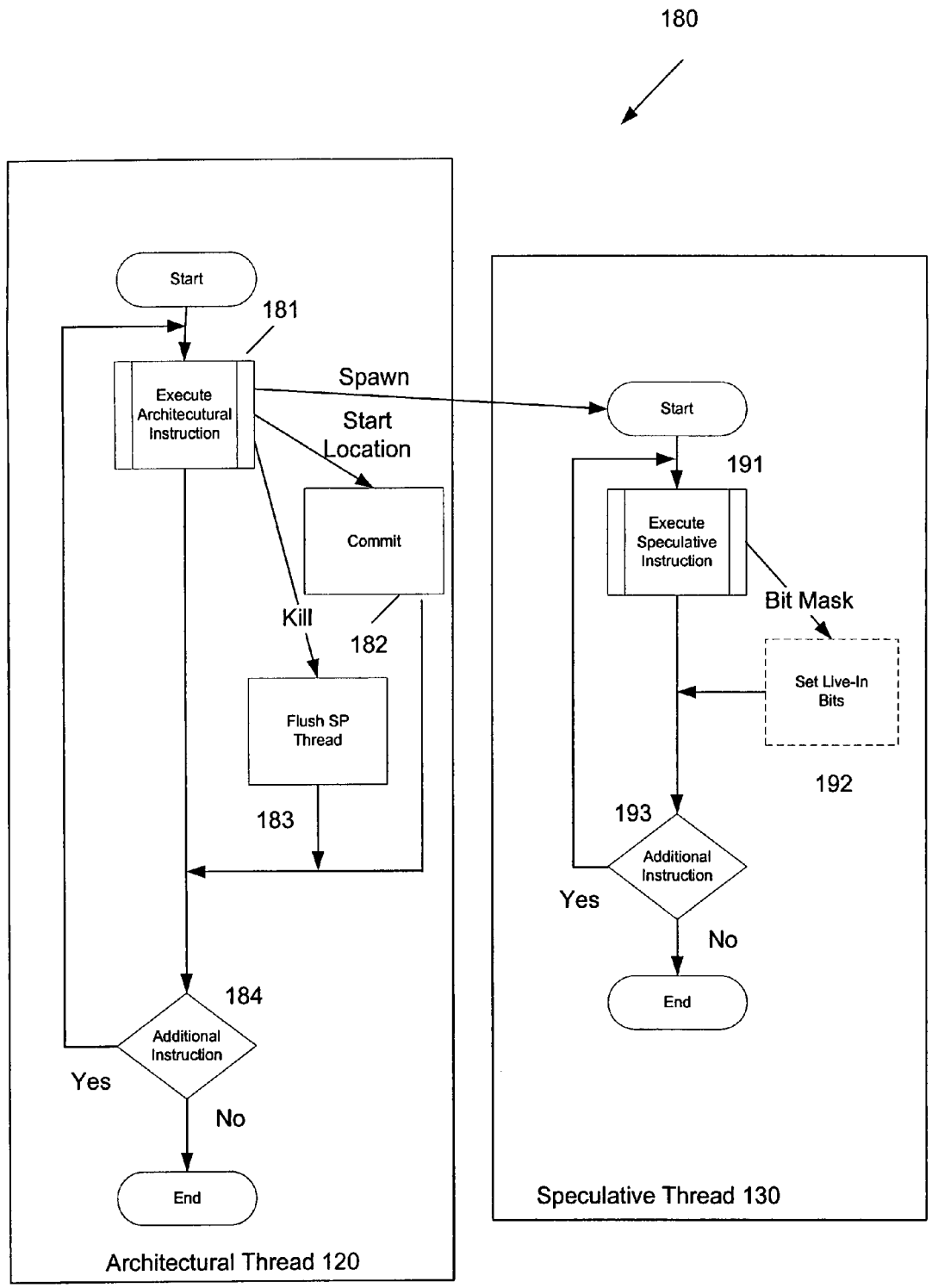
FIG. 1B is a process flow diagram according to one embodiment of this invention.

FIG. 1B is a high level process flow diagram for one embodiment of method 180 according to the principle of this invention. In view of this disclosure in its entirety, one of skill in the art can implement the process in processor 100 in a way that provides the most efficient performance based upon the capabilities available in processor 100 and any associated operating system or hypervisor for example.

In execute architectural instruction operation 181 of process 180, architectural thread 120 executes instructions in a computer program. If the instruction is instruction spawn, a speculative thread 130 is spawned by architectural thread 120 to initiate speculative execution, at a specified location, of instructions that are fetched and issued out of sequential order from the dynamic instruction stream, i.e., the instructions are fetched and issued following a very large lookahead instruction window, as defined above. Execution of instruction spawn also copies the values in architectural register file 121 to speculative register file 131.

If the execution of instructions in the dynamic instruction stream by architectural thread 120 has reached the specified location where speculative thread 130 started, speculative thread 130 becomes architectural thread 120. Thus, commit operation 182 stores any values buffered for storage by speculative thread 130 and clears bits 141 to 143 in registers in scoreboard 140 associated with speculative thread 130. Operation 182 transfers to additional instruction check operation 184.

If an instruction kill is executed in operation 181, flush speculative thread operation 183 flushes speculative thread 130 because the work is not needed. Operation 183 transfers to additional instruction check operation 184.

Figure 3:
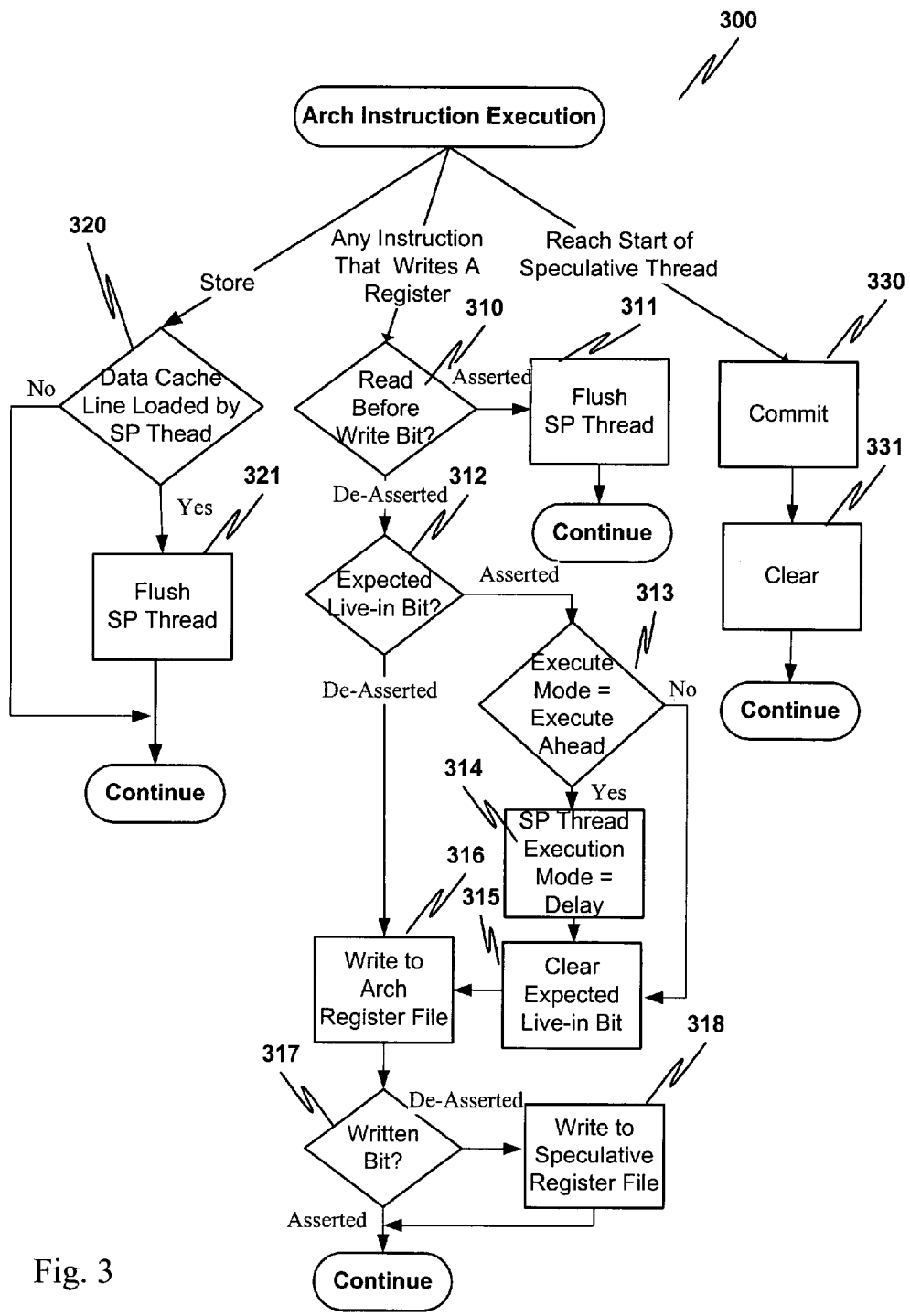
FIG. 3 is a more detailed process flow diagram for one embodiment of execute architectural instruction of FIG. 1B according to one embodiment of this invention.

As explained more completely below with respect to FIG. 3, when architectural thread 120 executes either a store instruction or any instruction that writes to a register, processing in addition to the normal processing for these instructions is done to accommodate processing associated with speculative thread 130.

When speculative thread 130 is spawned, if the first instruction executed by speculative thread 130, in execute speculative instruction operation 191 of process 180, is the optional instruction set_live_in_mask, set live-in bits operation 192 uses the bit mask to set the appropriate expected live-in bits 141 for registers in register scoreboard 140. Otherwise, speculative thread 130 executes instructions in the program subsequent to the specified starting point in execute speculative thread operation 191.

Figure 2:
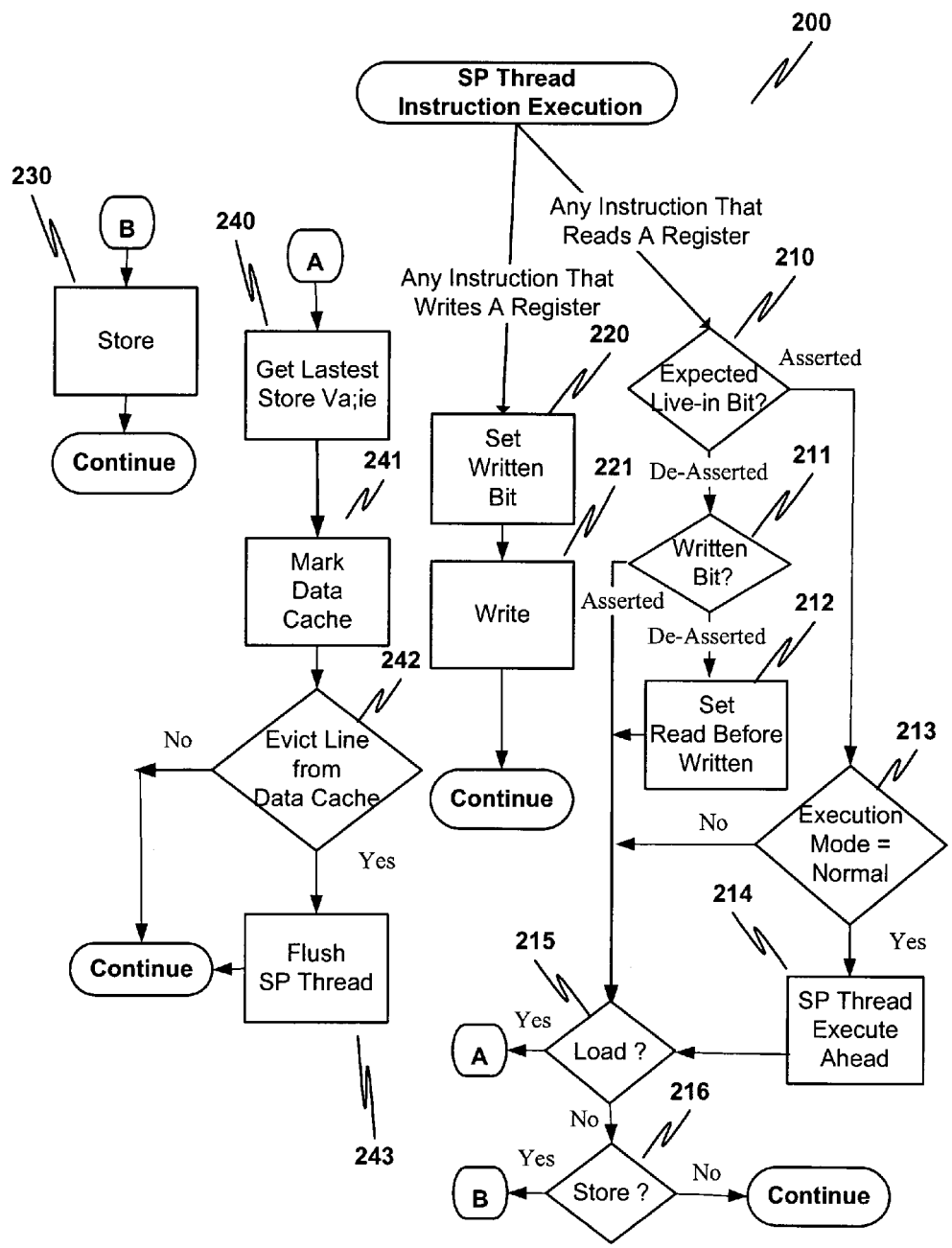
FIG. 2 is a more detailed process flow diagram for one embodiment of execute speculative instruction of FIG. 1B according to one embodiment of this invention.

As explained more completely below with respect to FIG. 2, when speculative thread 130 executes instructions that either read, write, or both read and write one or more registers, processing in addition to the normal processing for these instructions is done. Further, if the instruction is either a load instruction or a store instruction additional processing is done beyond that done for instructions that either read, write, or both read and write one or more registers. However, before these operations are considered, specific examples of code segments are used to illustrate process 180 further.

As an example of one embodiment of this invention, consider the following pseudo-code for a program segment:

```
loop:
    ...
    loop body    }Original Code Segment
    ...
    i = i + 1
    branch loop
```

In this example, the number of instructions in body of the loop between label loop and instruction "i=i+1" requires more than the available number of issue queue entries. Thus, in the prior art, each iteration of the loop was executed sequentially.

However, according to one embodiment of this invention, a compiler, for example, recognizes that the very large lookahead instruction window of this invention can be used and inserts instructions in the above program segment as shown below.

```
loop:
    Spawn innerloop ⎫
    ...              ⎪
    loop body        ⎬ Modified Code Segment
    ...              ⎪
    innerloop:       ⎭ i = i + 1
    branch loop
```

The compiler inserts instruction Spawn innerloop after label loop and the specified starting location for the speculative thread is identified by label innerloop. The complier also inserts label innerloop before instruction "i=i+1."

When architectural thread 120 is executing the dynamic instruction stream and reaches instruction Spawn innerloop, speculative thread 130 is spawned and starts executing at label innerloop. Architectural register file 121 is copied to speculative register file 131. However, as noted above, if the hardware needed to execute speculative thread 130 is busy, instruction Spawn innerloop is ignored.

In this example, instruction set_live_in_mask was not inserted and so none of expected live-in bits 141 are asserted. After architectural thread 120 spawns speculative thread 130, architecture thread 120 continues executing the instructions in the loop body.

Upon being spawned, speculative thread 130 starts executing at label innerloop, executes instruction "i=i+1" and then executes instruction branch loop and so branches to label loop. Speculative thread 130 ignores instruction Spawn innerloop. Thus, as shown in this example, instructions subsequent to the specified starting point does not mean only instructions physically located after the specified starting point, but rather instructions that would normally be executed, in time sequence, after the specified starting point is reached.

Thus, a first iteration through the loop is being executed by architectural thread 120, while simultaneously, a second iteration through the loop is being executed by speculative thread 130. Likely register dependencies between the speculative and architectural threads are hinted by the expected live-in bit mask, when that bit mask is used. If the expect live-in bit mask is not used, there will be more mis-speculations, but correctness is still maintained.

In this embodiment, there is no mechanism to indicate likely memory dependencies. For best performance, the compiler or runtime optimizer should attempt to convert expected memory dependencies into register dependencies. Like register dependencies, memory dependencies are always detected so correctness is always guaranteed.

In some applications, a segment of code may be speculatively executed, but for some reason architectural thread 120 does no reach that segment and so the speculation is of no use. To stop the speculation as soon as this situation is encountered instruction kill is provided. Specifically, if the compiler or runtime optimizer detects a path such that when that path is followed by architectural thread 120, the code segment speculatively executed will not be reached, instruction kill is inserted at the start of that path. When the path is executed, instruction kill flushes the speculative thread.

As an example of another embodiment of this invention, consider the following pseudo-code for a computer program segment:

```
    ...              ⎫
    if () {          ⎪
    ...              ⎪
    } else {         ⎪
    ...              ⎬ Original Code Segment
    branch Label2    ⎪
    }                ⎪
    ...              ⎪
    Label1:          ⎭

...
    code segment
    ...
    Label2:
    ...
```

Here, the outcome of the execution of instruction if is not known at compile time. However, if the "else" leg of instruction if is executed, the execution path jumps over the code segment between label Label1 and label Label2, which the compiler has identified as a code segment for non sequential fetch and issue. Thus, the modified computer program segment is:

```
    Spawn Label1     ⎫
    ...              ⎪
    if () {          ⎪
    ...              ⎪
    } else {         ⎪
    ...              ⎬ Modified Code Segment
    kill             ⎪
    branch Label2    ⎪
    }                ⎪
    ...              ⎪
    Label1:          ⎭

...
    code segment
    ...
    Label2:
    ...
```

The compiler inserts instruction Spawn Label1 to implement the very large lookahead instruction window. The compiler also inserts an instruction kill immediately before instruction branch Label2 whose execution causes the code segment being speculatively executed to be skipped. Execution of instruction kill by architectural thread 120 flushes speculative thread 130. Expected live-in bit 141, read-before-written bit 143 and written bit 142 of all the registers associated with speculative thread 130 in register scoreboard 140 also are cleared.

When architectural thread 120 is executing the dynamic instruction stream and reaches instruction Spawn Label1, speculative thread 130 is spawned and starts a non-sequential fetch and issue at label Label1. However, as noted above, if the hardware needed to execute speculative thread 130 is busy, instruction Spawn Label1 is ignored.

In this example, instruction set_live_in_mask was not inserted and so none of expected live-in bits 141 are asserted in register scoreboard 140 by speculative thread 130. After architectural thread 120 spawns speculative thread 130, architecture thread 120 continues sequentially executing the instructions in the computer program segment.

Upon being spawned, speculative thread 130 starts at label Label1 and executes the instructions following that label. When architectural thread 120 executes instruction if, if the "else" part of instruction if is not executed, architectural thread 120 continues and when label Label1 is reached, the speculative work is committed. Conversely, if the "else" part of instruction if is executed, instruction kill is executed and speculative thread 130 is flushed as described above.

The use of instruction kill within an instruction if is illustrative only and is not intended to limit the invention to this particular embodiment. In view of this disclosure, one of skill in the art can use instruction kill to flush the speculative thread as appropriate for a particular application of this invention.

Operation of Speculative Thread

After speculative thread 130 has been spawned by executing instruction spawn thread_start_PC, speculative thread 130 begins execution at the specified starting location, thread_start_PC. In one embodiment, instruction set_live_in_mask is inserted at this starting location so that the expected live-in bits 141 in register scoreboard 140 can be set. Care should be exercised in setting the bit mask of this instruction. Registers that are ready prior to the execution of speculative thread 130 should not be included in the mask. Process 200 in FIG. 2 illustrates the modifications utilized in execute speculative instruction operation 191.

Issue of an Instruction that Reads a Register

When an instruction that reads a register is executed in speculative (SP) thread 130, prior to the normal operations performed by that instruction, expected live-in bit state check operation 210 determines whether expected live-in bit 141 in register scoreboard 140 for the register being read is asserted. If expected live-bit 141 is asserted, the register value is not available and speculative thread 130 must wait for the register to be written by architectural thread 120. Thus, processing transfers to execution mode equals normal check operation 213. Conversely, if expected live-bit 141 is de-asserted, the register value should be available, and processing transfers to written bit state check operation 211.

Execution mode equals Normal check operation 213 determines whether the current execution mode for speculative thread 130 is Normal. If the execution mode is Normal, processing transfers to speculative thread execute ahead operation 214 and otherwise the instruction is added to a deferred instruction execution queue for speculative thread 130 and processing continues.

Speculative thread execute ahead operation 214 adds the instruction to a deferred instruction execution queue for speculative thread 130. The execution mode for speculative thread 130 is set to Execute Ahead because the register has not yet been written by architectural thread 120. Processing then continues with load check operation 215 and store check operation 216, as described more completely below.

As described above, if expected live-bit 141 for the register being read is de-asserted, processing transfers to written bit state check operation 211, which determines whether written bit 142 for the register being read is asserted. If written bit 142 in register scoreboard 140 is not asserted, check operation 211 transfers to set read-before-written operation 212 that in turn sets read-before-written bit 143 for the register being read in register scoreboard 140 and then transfers to load check operation 215. Conversely, if written bit 142 in register scoreboard 140 is asserted, processing continues with load check operation 215 and store check operation 216, as described more completely below.

Issue of an Instruction that Writes a Register

When an instruction that writes a register is executed in speculative thread 130, set written bit operation 220 sets written bit 142 in scoreboard 140 for the register being written. Operation 221 transfers processing to write operation 221. Write operation 221 writes the register in speculative register file 131 and not in architectural register file 121. Following completion of operation 221, processing continues.

Issue of Store Instruction

When a store instruction is executed in speculative thread 130, as is known to those of skill in the art, a register is read. Thus, operations 210 to 214, as described above, are performed as appropriate. When load check operation 215 is reached, an load instruction is not being executed and so load check operation transfers to store check operation 216 that in turn transfers to store operation 230 because a store instruction is being executed. Store operation 230 does not commit the store value to memory 170, but instead writes the value in speculative store buffer 132 and then processing continues.

Issue of Load Instruction

When a load instruction is executed in speculative thread 130, as is known to those of skill in the art, a register is read and a register is written. For the register that is written, operations 220 and 221 are performed, as described above. For the register that is read, operations 210 to 214, as described above, are performed as appropriate. When load check operation 215 is reached, processing transfers to get latest store value operation 240.

Get latest store value operation 240 checks speculative store buffer 132 of speculative thread 130, architectural store buffer 122 of architectural thread 120, as well as data cache 150 to pick up the latest store value. The latest store value is selected from only one of the three locations. Get latest store value operation 240 transfers to mark data cache operation 241.

Mark data cache operation 241 marks the corresponding line in data cache 150 to indicate that this portion of the line was speculatively loaded. Subsequently, when evict line from data cache check operation 242 detects that this line is to be evicted from the cache (e.g. for capacity reasons, or in response to a snoop request from the system), the speculation has failed and speculative thread 130 is flushed in operation 243.

Check operation 242 and operation 243 are included in the load instruction sequence for convenience only and should not be interpreted as requiring their operation in a sequential fashion as illustrated. Operations 242 and 243 are performed when it is determined that a line including speculatively loaded data is to be evicted from data cache 150, irrespective of what instructions is executing at that time in speculative thread 130.

Operation of Architectural Thread

To support the very large lookahead instruction window, some changes are made to the issue of store instructions and instructions that write a register to coordinate the execution of architectural thread 120 with the execution of speculative thread 130. Process 300 in FIG. 3 illustrates the modifications utilized in execute architectural instruction operation 181.

Issue of an Instruction that Writes a Register

When architectural thread 120 executes an instruction that writes a register, read-before-written bit check operation 310 determines whether read-before-written bit 143 for that register is asserted in register scoreboard 140. If read-before-written bit 143 is asserted, speculative thread 130 has read a stale value. Thus, check operation 310 transfers to flush speculative (SP) thread operation 311 that flushes speculative thread. Expected live-in bit, read-before-written bit and written bit of all the registers associated with speculative thread 130 in register scoreboard 140 also are cleared. Processing then continues.

Conversely, if read-before-written bit 143 is de-asserted, check operation 310 transfers to expected live-in bit state check operation 312. If expected live-in bit 141 is asserted for the register being written, speculative thread 130 is waiting for the value in that register to become available. Thus, when expected live-in bit 141 is asserted, check operation 312 transfers to execution mode equals Execute Ahead check operation 313.

Execution mode equals Execute Ahead check operation 313 determines whether the current execution mode is Execute Ahead. If the current execution mode is Execute Ahead, check operation 313 transfers to speculative (SP) thread execution mode equals Delay operation 314 and otherwise to clear expected live-in bit operation 315 without changing the execution mode of speculative thread 130.

Speculative thread execution mode equals Delay operation 314 sets the execution mode for speculative thread 130 to Delay mode DLY. Thus, instructions in speculative thread 130 that were waiting for the register value can now be executed. Note that if architectural thread 120 writes before speculative thread 130 reads, the execution mode of the processor remains in Normal mode. However, it is possible that speculative thread 130 enters execution mode Execute Ahead due to other conditions that cause Normal to Execute Ahead mode transitions. In the latter case, the execution mode of the processor transitions to Delay mode in operation 314 when architectural thread 120 writes the register and the deferred queue is unnecessarily scanned.

Upon completion, speculative thread delay mode operation 314 transfers to clear expected live-in bit operation 315 that in turn clears expected live-in bit 141 in scoreboard 140 for the register being written. In this embodiment, operation 315 transfers processing to write to architectural register file operation 316.

Write to architectural register file operation 316 writes the register in architectural register file 121. Operation 316 transfers to written bit check operation 317.

Written bit check operation 317 determines whether written bit 142 for that register in scoreboard 140 is de-asserted. If written bit 142 is de-asserted, processing transfers to write to speculative register file operation 318 and otherwise continues. Write to speculative register file operation 318 writes to the register in speculative register file 131 and processing then continues.

Issue of Store Instruction

When a store instruction is executed (or committed) by architectural thread 120, check operation 320 determines whether the same memory location in data cache 150 has been loaded by speculative thread 130. If so, the speculation has failed because speculative thread 130 read a stale memory value. In this case, speculative thread 130 is flushed in flush speculative thread operation 321 and then processing continues.

Speculative Thread Becomes Architectural Thread

When architectural thread 120 reaches the starting location of speculative thread 130, speculative thread 130 becomes architectural thread 120 and speculative register file 131 becomes architectural register file 121. At this point, commit operation 330 commits the store values buffered in store buffer 132 to memory, e.g., memory 170. Moreover, the expected live-in bit, read-before-written bit and the written bit of all the registers in the scoreboard are cleared in clear operation 331. Note that instruction set_live_in_mask is ignored by architectural thread 120.

In the above description, when it is stated that an instruction, thread, or operation performs a function those of skill in the art understand that this means that a processor, hardware or a combination of the processor and hardware causes the function to be performed.

The principles of this invention can be utilized in a processor, which supports multithreading, to achieve a very large lookahead instruction window by facilitating non-sequential fetch and processing of the dynamic instruction stream. One embodiment of this invention substantially improves performance on many floating-point technical workloads. This performance improvement is achieved with very minimal modifications to existing processor design. Other than modifications to the control logic of the issue unit, only three additional bits in the register scoreboard are needed as described above.

In one embodiment, embodiments of processor 100 can be included in various parts of a computer system 410 (FIG. 4), e.g., processor 100A is the main processor for computer system 410. Computer system 410 has a hardware configuration like a stand-alone personal computer or workstation that includes a keyboard 415, a display 416 and a mouse 418. However, in another embodiment, computer system 410 is part of a client-server computer system 400.

For either a client-server computer system or a stand-alone computer system, memory 412 typically includes both volatile memory, such as main memory, and non-volatile memory, such as hard disk drives. In still another embodiment, computer system 410 is contained in a single package. A support circuit 413 also includes a circuit that in turn includes a processor 100B.

Figure 4:
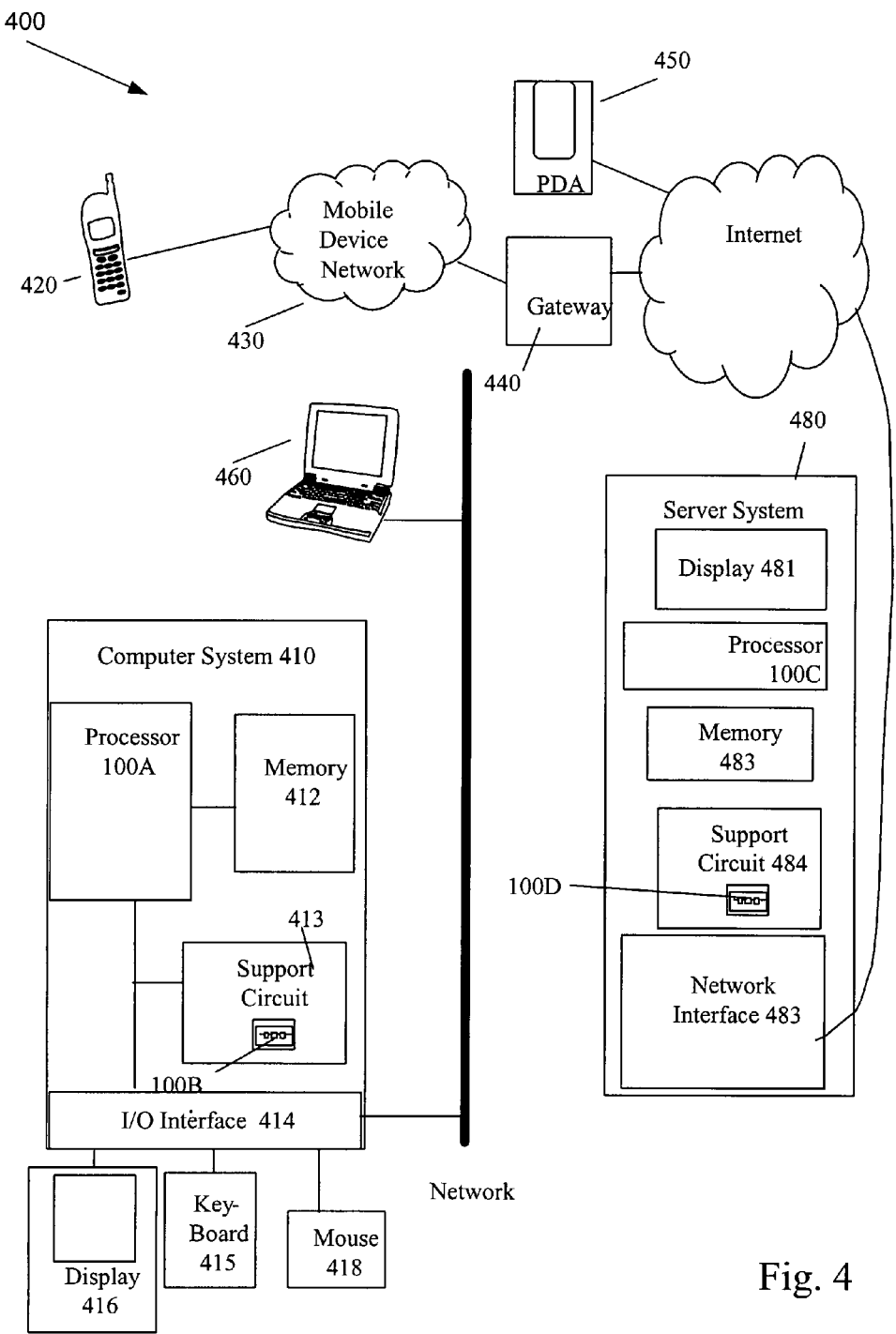
FIG. 4 is block diagram of structures and networks suitable to use the processes of FIGS. 1B, 2 and 3 according to one embodiment of this invention.

While in FIG. 4, computer system 410 is illustrated as a single unit, computer system 410 can be comprised of multiple different computers, wireless devices, server computers, or any desired combination of these devices that are interconnected. In view of this disclosure, an embodiment of processor 100 can be implemented in a wide variety of computer system configurations. For example, an embodiment of processor 100 can be included in any one of, all, or any combination of cellular telephone 420, mobile device network 430, gateway 440, portable computer 460, personal digital assistant 450 or any other device that utilizes a processor.

In FIG. 4, server system 480 includes a processor 100C, a support circuit 484 that includes a processor 100D, and a network interface 485. Processor 100C is coupled to memory 483.

While in FIG. 4 the memory coupled to a processor is included in the same physical location as the processor, this is illustrative only. Processor 100C is also coupled to memory 412 via the networks. Thus, the memory coupled to a processor can be remotely located from the processor.

Those skilled in the art readily recognize that in this embodiment the individual operations, which were mentioned before in connection with methods 180, 200 and 300 are performed by executing computer program instructions on processor 100, e.g., any one or more of processors 100A to 100D. In one embodiment, a storage medium has thereon installed computer-readable program code for each of or any combination of methods 180, 200 and 300, and execution of the computer-readable program code causes processor 100 to perform the operations explained above.

Herein, a computer program product comprises a medium configured to store or transport computer readable code for any one, all or any combination of methods 180, 200 and 300 or in which computer readable code for any one, all or any combination of methods 180, 200 and 300 is stored. Some examples of computer program products are CD-ROM discs, DVD discs, flash memory, ROM cards, floppy discs, magnetic tapes, computer hard drives, servers on a network and signals transmitted over a network representing computer readable program code. A tangible computer program product comprises a medium configured to store computer readable code for any one, all or any combination of methods 180, 200 and 300 or in which computer readable code for any one, all or any combination of methods 180, 200 and 300 is stored. Some examples of tangible computer program products are CD-ROM discs, DVD discs, flash memory, ROM cards, floppy discs, magnetic tapes, computer hard drives, and servers on a network.

Herein, a computer memory refers to a volatile memory, a non-volatile memory, or a combination of the two.

Methods 180, 200 and 300 are implemented, in one embodiment, using a computer source program. The computer program may be stored on any common data carrier like, for example, a floppy disk or a compact disc (CD), as well as on any common computer system's storage facilities like hard disks. Therefore, one embodiment of the present invention also relates to a data carrier for storing a computer source program for carrying out the inventive method. Another embodiment of the present invention also relates to a method for using a computer system for carrying out methods 180, 200 and 300. Still another embodiment of the present invention relates to a computer system with a storage medium on which a computer program for carrying out methods 180, 200 and 300 is stored.

While methods 180, 200 and 300 hereinbefore have been explained in connection with one embodiment thereof, those skilled in the art will readily recognize that modifications can be made to this embodiment without departing from the spirit and scope of the present invention.

I claim:

1. A computer processor based method comprising:
   executing, by an architectural thread, instructions in a dynamic instruction stream;
   spawning a speculative thread at a specified location in the dynamic instruction stream during the executing by the architectural thread; and
   executing, by the speculative thread, instructions in the dynamic instruction stream subsequent to the specified location so that instructions in the dynamic instruction stream are fetched and issued out of sequential order with respect to the executing by the architectural thread, wherein the specified location is at least more than two-hundred instructions beyond the oldest instruction that is awaiting completion of execution for the architectural thread.

2. The computer processor based method of claim 1 wherein the executing by the speculative thread further comprises:
   applying a bit mask to expected live-in bits in a register scoreboard to assert an expected live-in bit for each register that the speculative thread expects to have a value made available by the executing by the architectural thread.

3. The computer processor based method of claim 1 wherein the executing by the speculative thread further comprises:
   checking a state of a written bit, in a register scoreboard, for a register that is read in executing an instruction.

4. The computer processor based method of claim 3 wherein the executing by the speculative thread further comprises:
   asserting a read-before-written bit for the register in the register scoreboard when the checking ascertains that the written bit is not asserted.

5. The computer processor based method of claim 4 wherein the executing by the architectural thread further comprises:
   reading the read-before-written bit in executing an instruction that writes to the register; and
   flushing the speculative thread upon determining the read-before-written bit is asserted.

6. The computer processor based method of claim 1 wherein the executing by the architectural thread further comprises:
   reading a read-before-written bit for a register in a register scoreboard in executing an instruction that writes the register; and
   flushing the speculative thread upon determining the read-before-written bit is asserted.

7. The computer processor based method of claim 1 further comprising:
   using an architectural register file by the executing by the architectural thread wherein the architectural register file stores only architectural values; and
   using a speculative register file by the executing by the speculative thread wherein the speculative register file stores architectural values and speculative values.

8. The computer processor based method of claim 1 wherein the executing by the speculative thread further comprises:
   getting a latest value from one of a speculative store buffer, an architectural store buffer, and a data cache depending on which of said speculative store buffer, said architectural store buffer, and said data cache stores said latest value; and
   marking a line a data cache corresponding to a load of the latest value to indicate that at least a portion of the line was speculatively loaded.

9. The computer processor based method of claim 8 further comprising:
   flushing the speculative thread upon eviction of the line from the data cache.

10. The computer processor based method of claim 8 wherein the executing by the architectural thread further comprises:
    flushing the speculative thread upon storing to at least the portion of the line.

11. The computer processor based method of claim 1 wherein the executing by the speculative thread further comprises:
    asserting a written bit for a register in a register scoreboard in executing an instruction that writes the register.

12. The computer processor based method of claim 1 wherein the executing by the speculative thread further comprises:

checking a state of an expected live-in bit, in a register scoreboard, for a register in executing an instruction that reads the register.

13. The computer processor based method of claim 12 wherein the executing by the speculative thread further comprises:
setting an execution mode for the speculative thread to Execute Ahead when the state of the expected live-in bit is an asserted state and the execution mode is Normal.

14. The computer processor based method of claim 1 wherein the executing by the architectural thread further comprises:
checking a state of an expected live-in bit, in a register scoreboard, for a register in executing an instruction that writes the register.

15. The computer processor based method of claim 14 wherein the executing by the architectural thread further comprises:
setting an execution mode for the speculative thread to Delay when the state of the expected live-in bit is an asserted state and the speculative thread execution mode is Execute Ahead; and
de-asserting the expected live-in bit.

16. The computer processor based method of claim 1 wherein the executing by the architectural thread further comprises:
checking a state of a written bit, in a register scoreboard, for a register in executing an instruction that writes the register; and
writing to the register in a speculative register file when the state of the written bit is a de-asserted state.

17. A system comprising:
a memory having embedded therein computer executable instructions; and
a processor coupled to the memory wherein execution of the computer executable instructions results in a method comprising:
executing, by an architectural thread, instructions in a dynamic instruction stream;
spawning a speculative thread at a specified location in the dynamic instruction stream during the executing by the architectural thread; and
executing, by the speculative thread, instructions in the dynamic instruction stream subsequent to the specified location so that instructions in the dynamic instruction stream are fetched and issued out of sequential order with respect to the executing by the architectural thread,
wherein the specified location is at least more than two-hundred instructions beyond the oldest instruction that is awaiting completion of execution for the architectural thread.

18. The system of claim 17 where said processor further comprises:
a register scoreboard including a plurality of register entries, where each register entry includes: a written bit; a read-before-written bit; and an expected live-in bit.

19. A computer program product comprising a tangible computer readable medium having embedded therein computer program instructions wherein execution of the computer program instructions by a computer processor results in a method comprising:
executing, by an architectural thread, instructions in a dynamic instruction stream;
spawning a speculative thread at a specified location in the dynamic instruction stream during the executing by the architectural thread; and
executing, by the speculative thread, instructions in the dynamic instruction stream subsequent to the specified location so that instructions in the dynamic instruction stream are fetched and issued out of sequential order with respect to the executing by the architectural thread,
wherein the specified location is at least more than two-hundred instructions beyond the oldest instruction that is awaiting completion of execution for the architectural thread.

* * * * *